ns.

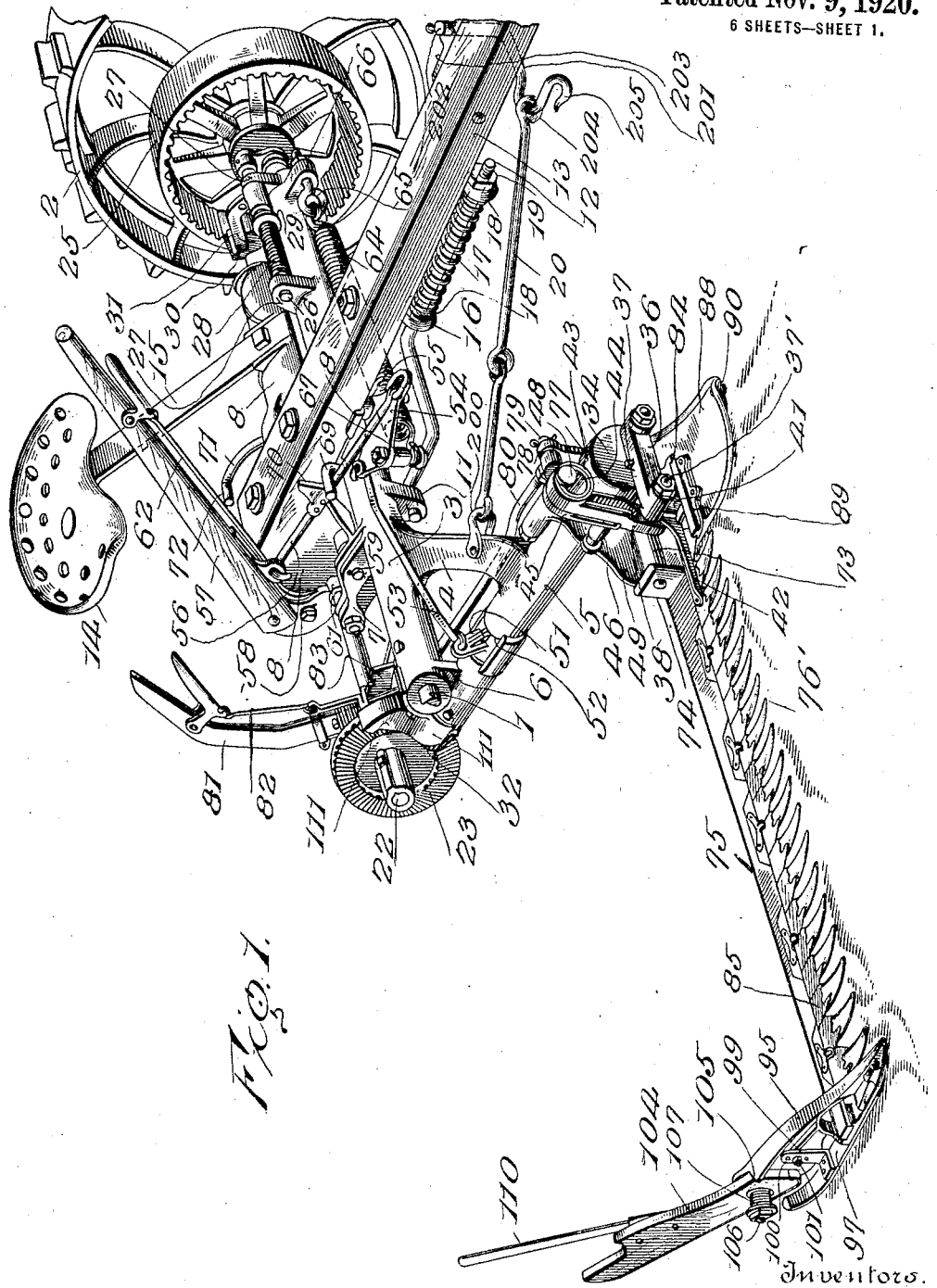

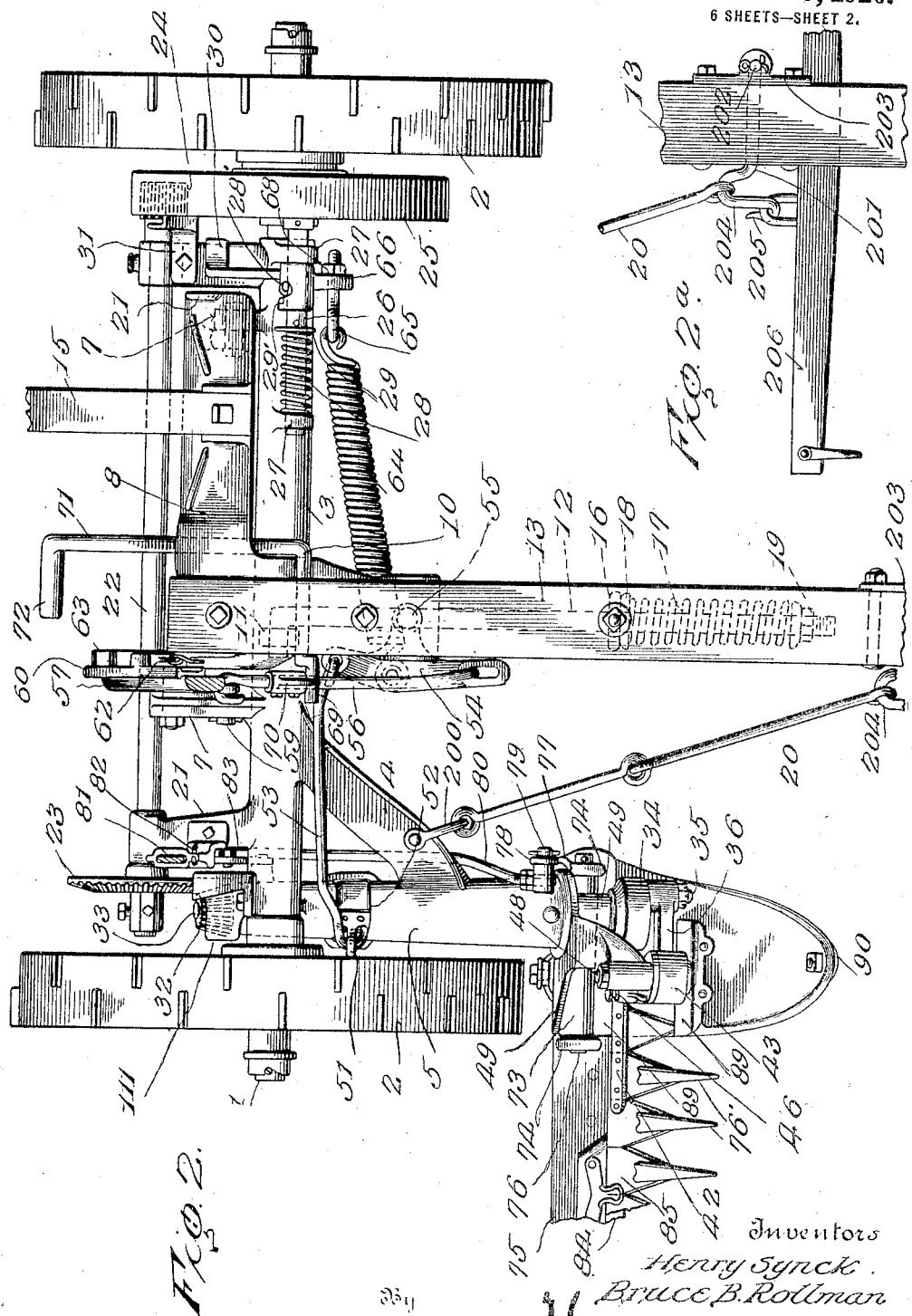

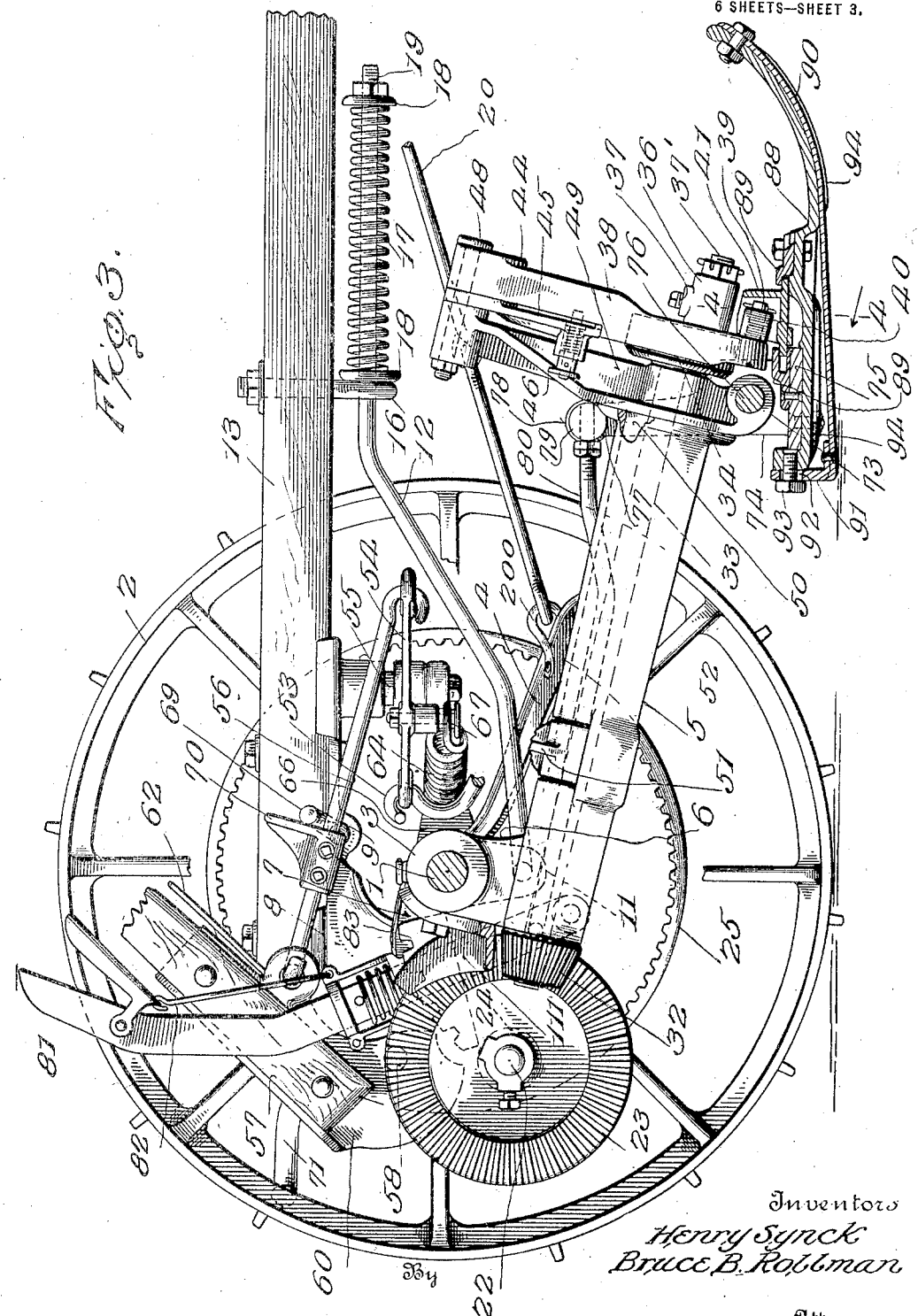

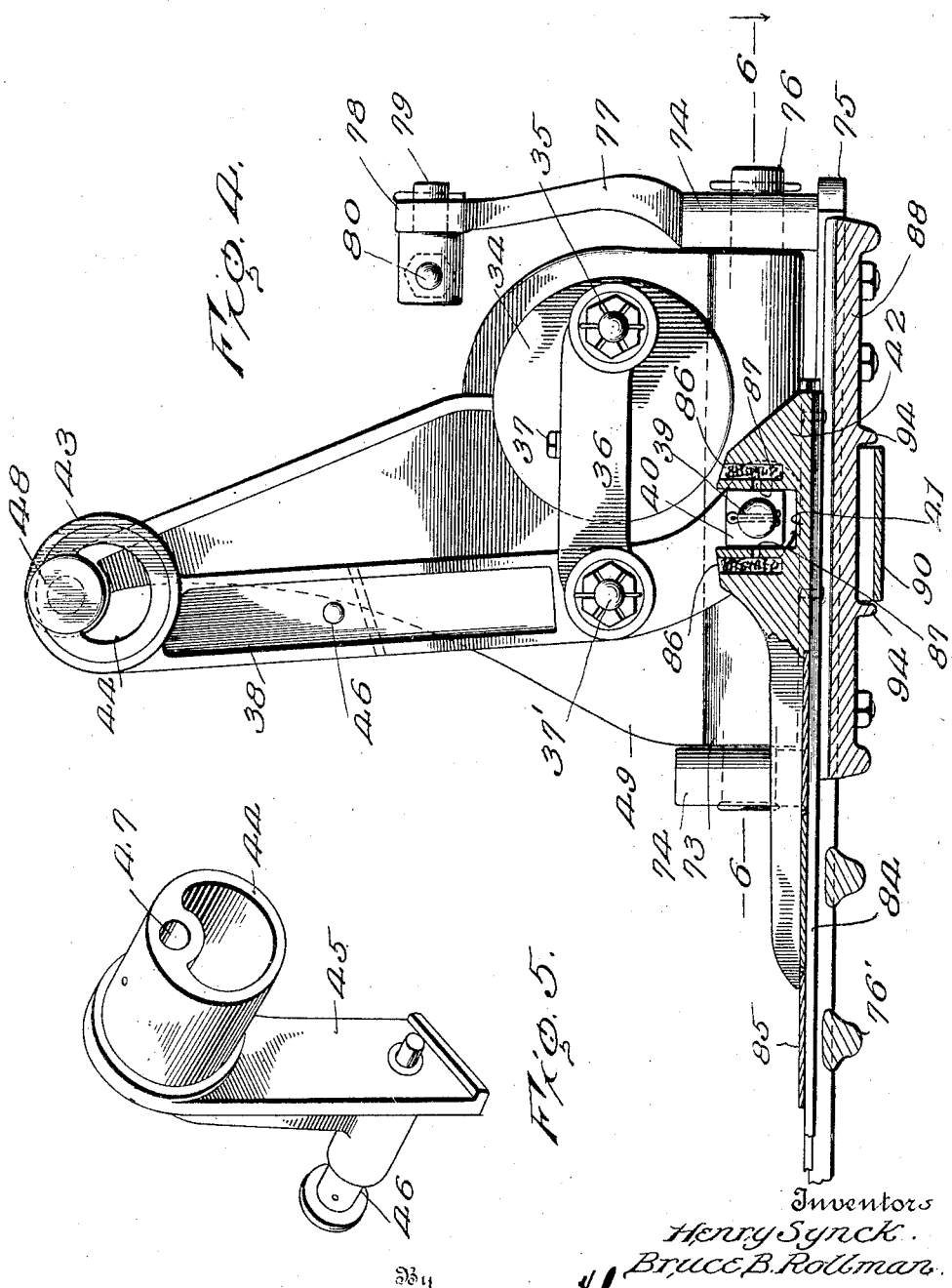

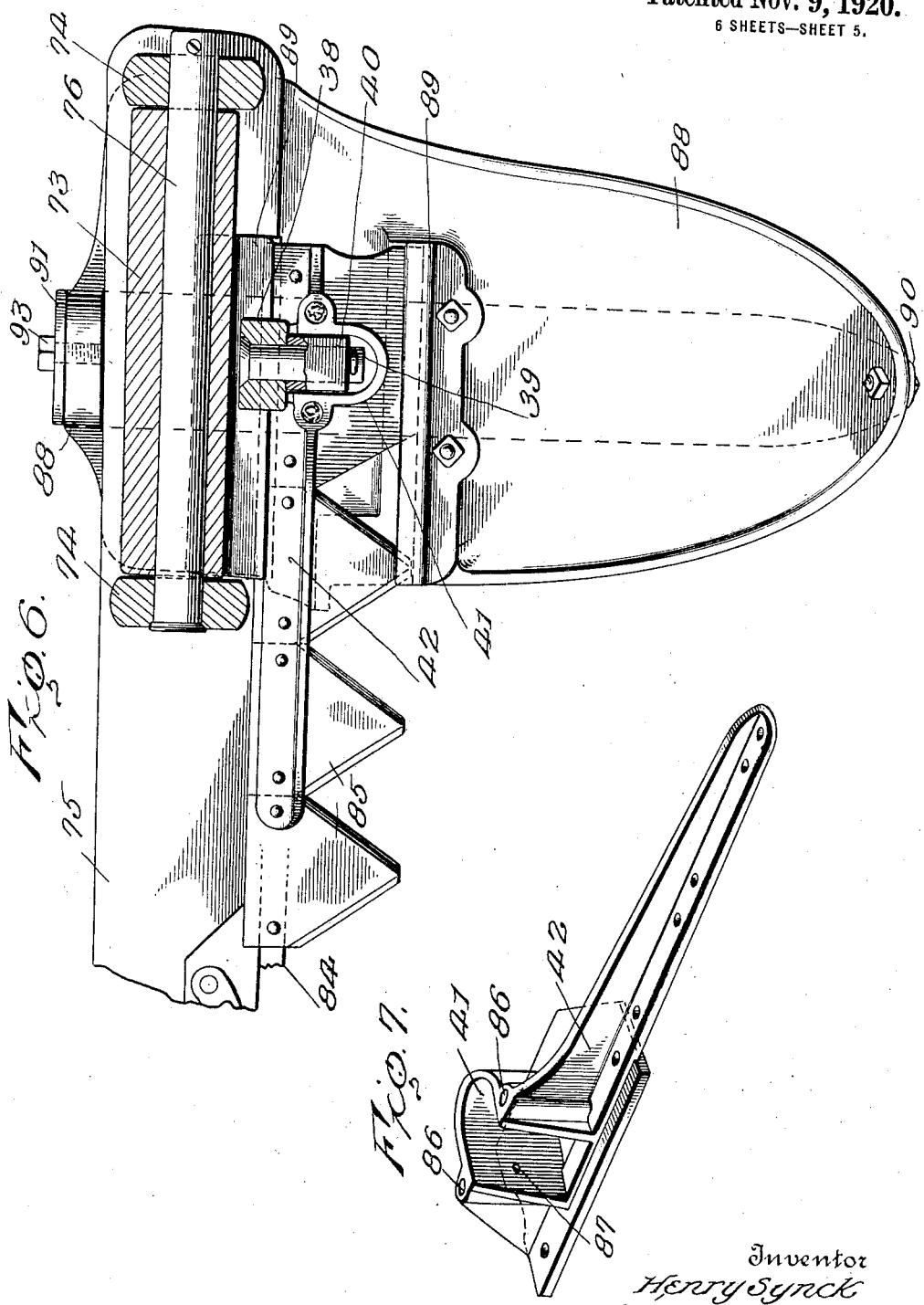

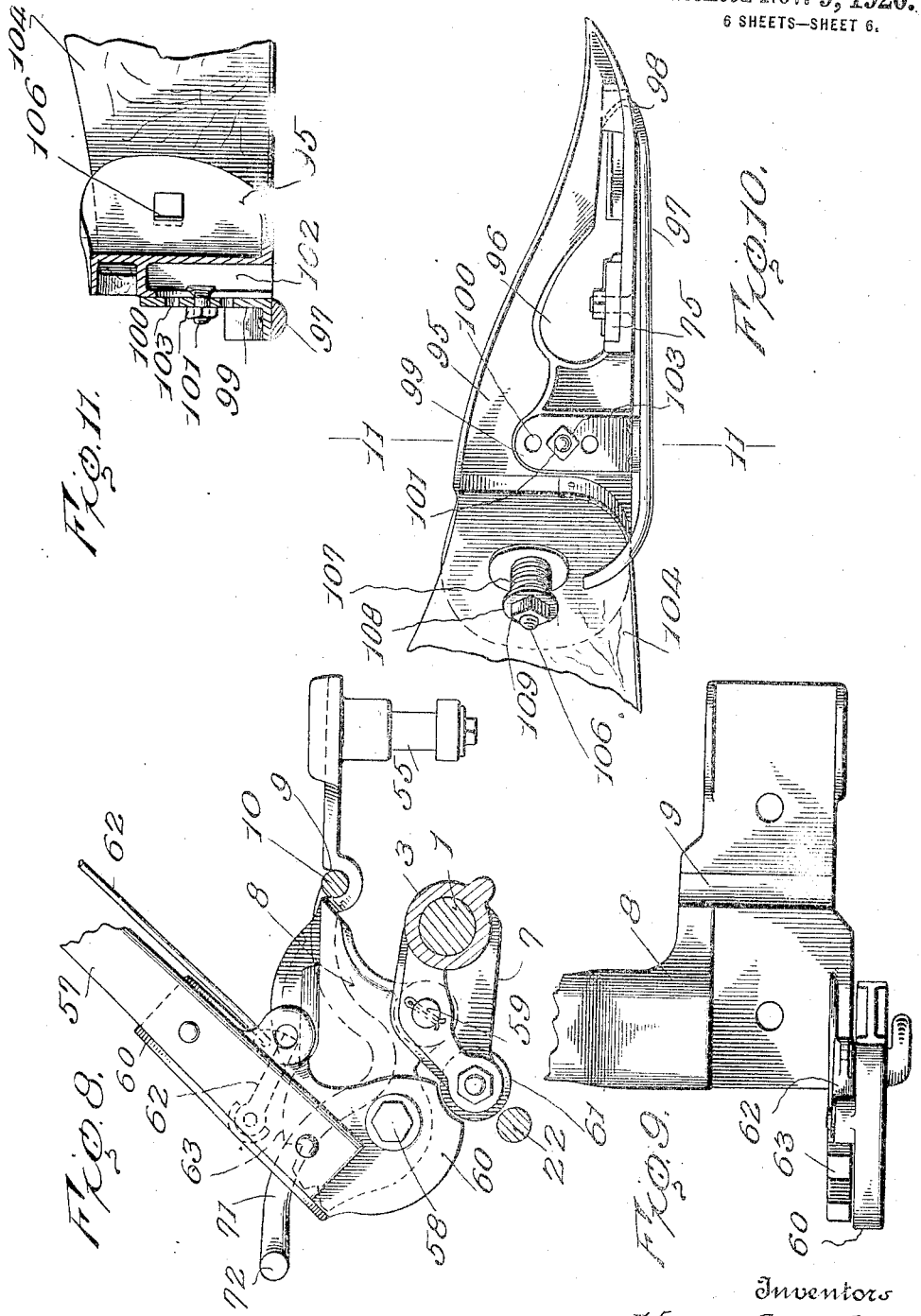

UNITED STATES PATENT OFFICE.

HENRY SYNCK AND BRUCE B. ROLLMAN, OF COLDWATER, OHIO, ASSIGNORS TO NEW IDEA SPREADER CO., OF COLDWATER, OHIO.

MOWER.

1,358,401.  Specification of Letters Patent.  Patented Nov. 9, 1920.

Application filed February 16, 1918. Serial No. 217,620.

*To all whom it may concern:*

Be it known that we, HENRY SYNCK and BRUCE B. ROLLMAN, citizens of the United States, residing at Coldwater, in the county of Mercer and State of Ohio, have invented certain new and useful Improvements in Mowers, of which the following is a specification.

Our invention relates to mowing machines, and has for its objects the provision of a machine of novel construction in which an unobstructed clearance for the cut grass will be provided and pounding of the same by the transverse pitman present in the mowers now in common use will be avoided; to provide novel operating mechanism whereby the cutter may be raised without stopping the progress of the machine or shifting the driving mechanism and thereby avoiding any interruption to the operation of the cutter; to provide novel means whereby the cutter may be set to run at any desired height; to provide novel means for effecting oscillation of the cutter; to provide novel means for rocking the cutter whereby it may be set to lift and cut fallen or matted grass or to ride over substances which it is desired to omit from the harvested material, and to provide novel means for applying the draft to the frame of the machine whereby the draft will act in opposition to the tendency of the operating mechanism to drop and dig into the ground. The invention also seeks to improve generally the construction and arrangement of the parts of a mower to the end that the efficiency of the same may be increased and the life of the machine prolonged.

Our invention is illustrated in the accompanying drawings, in which—

Figure 1 is a perspective view of a mowing machine with parts broken away;

Fig. 2 is a plan view of the same with parts in section and parts of the cutter omitted;

Fig. 2ᵃ is a detail plan view of the front portion of the draft hitch;

Fig. 3 is a side view with one traction wheel removed and the cutter shown in vertical section upon a plane passing longitudinally through the inner shoe;

Fig. 4 is an enlarged detail sectional elevation taken on the line 4—4 of Fig. 3;

Fig. 5 is a detail perspective view of the eccentric mounting for the oscillating arm which acts upon the cutter;

Fig. 6 is a view, partly in plan and partly in horizontal section, on the line 6—6 of Fig. 4;

Fig. 7 is a detail perspective view of the yoke or bearing at the inner end of the cutter through which motion is transmitted to the cutter from the oscillating arm;

Fig. 8 is a detail sectional elevation of a portion of the lifting mechanism;

Fig. 9 is a plan view of the same;

Fig. 10 is a side elevation of the outer shoe;

Fig. 11 is a detail transverse section on the line 11—11 of Fig. 10.

In carrying out our invention, we employ an axle 1 upon which the traction wheels 2 are loosely mounted and upon which they are adapted to act through the well-known escapement mechanism so that upon forward rotation of the wheels the axle will be rotated and upon backward rotation of the wheels the axle will remain stationary. The axle passes through and is carried by a sleeve or hollow frame member 3 which is constructed at one end with an integral bracing arm 4 and a longitudinally extending sleeve 5 which projects forwardly and downwardly to support the inner shoe and the mechanism for actuating the cutter. The sleeve 5 will generally be disposed at the right hand end of the frame 3 as the cutter is now almost universally arranged at the right hand side of the machine and the said sleeve may be further connected with the end of the frame member 3 by a web 6 as will be readily understood. The frame 3 is provided on its rear side at proper points with rearwardly projecting lugs or arms 7 and a pole casting 8 is pivotally secured to the said lugs, the pole casting being provided with a transverse seat 9 for a rock shaft or foot lever 10 which will be presently more fully described. The pole casting is pivotally secured to the lugs or arms 7 so that there may be relative rocking movement between the frame and the pole or tongue and the frame member 3 is further provided on its under side with a depending lug or ear 11 in which the rear end of the compensating rod 12 is engaged. The pole or tongue 13 is rigidly secured upon the upper side of the pole casting 8 and the seat 14 is carried by a seat standard 15 which is rigidly secured upon the said pole casting as shown and as will be readily understood. The rod 12 is slidably mounted in an eye 16 which is carried upon the underside of the pole 13 and a spring 17 acts upon the front end of this rod so as to partially neutralize the downward pressure exerted by the cutter and the gearing for operating the same. The spring 17 is mounted between washers 18, one bearing against the eye 16 and the other bearing against a nut 19 whereby the tension of the spring may be regulated. The spring 17 should be so adjusted when the machine is set up that with the driver in the seat 14 the inner shoe carried by the front end of the sleeve 5 will rest lightly upon the ground and will barely tend to rise therefrom so that the weight of the cutting mechanism will be balanced by the tension of the spring. The draft is applied through the draft rod 20 to the frame, the pole or tongue 13 being used solely for steering or guiding the machine and, consequently, not imposing any chafing draft or weight on the necks of the animals. The draft rod 20 is jointed or flexible so that it may accommodate the relative movement between the pole and the frame and its rear end is connected to the brace 4 by a clevis 200 so as to have free movement. The front end of the rod 20 is engaged over a coupling consisting of a shank 201 passing under the pole and having one end 202 turned up and pivoted in a bracket 203 which is secured against the left side of the pole. The shank 201 is shaped to provide a bend or recess 204 in which the front end of the draft rod is received and held and the extremity of the shank is turned forward and formed into a hook 205 for carrying the doubletree 206. Swingle-trees are attached to the ends of the doubletree and it will be understood that the arrangement of the draft rod eliminates side draft and permits the cutter to follow the surface of the ground.

Referring more particularly to Fig. 2ᵃ, it will be readily understood that the provision of the coupling, disposed as shown and described, provides a variable leverage for the draft so that the team will pull more or less directly upon the frame as the position of the frame may vary, it being noted that normally the recess 204 will be in rear of the transverse plane of the pivot 202 while the hook 205 will be in advance of said plane. When the machine is in use, if the shoe should fall into a rut the frame will rock so that the member 4 thereof will exert a pull upon the draft rod 20 and cause the coupling to swing rearwardly about its pivotal end 202. The draft hook 205 will, therefore, follow an arc taking it slightly away from the tongue or pole while the recess in which the end of the draft rod 20 is engaged will swing relatively toward the pole, the result being that the coupling will then act as a lever through which the power of the team will be applied to the draft rod 20 and, therefore, quickly raise the frame and pull the shoe or cutter out of the rut or depression into which it dropped. If the shoe should tend to ride up above the proper surface or level, the coupling could swing forwardly and the front end of the draft rod 20, engaged in the recess 204, would swing relatively away from the pole while the hook 205 would swing toward the pole and the pull exerted through the whiffletree would practically act directly upon the front end of the draft rod 20 and through said rod in a straight line on the frame. We thus automatically maintain the cutter at the true cutting level without putting excessive strain upon the draft team.

The frame member 3 is provided at or near its ends with rearwardly projecting bearing arms 21 in the rear ends of which a driving shaft 22 is journaled, this driving shaft being provided with a bevel gear 23 at one end and with a spur pinion 24 at its opposite end. The spur pinion 24 meshes with an internal gear 25 which is mounted loosely upon the axle and is adapted to be connected with the adjacent ground wheel 2 through a clutch of any preferred type, the said clutch being equipped with and controlled by a shifting rod 26 which is slidably mounted in eyes 27 upon the frame 3 and normally held projected, so as to connect the internal gear 25 with the traction wheel, by a spring 28 coiled around the rod between the inner lug or ear 27 and a stop 29 on the rod. A pin 28' upon the shifting rod bears upon a cam 29' which is rigid with and may be a part of a foot lever 30 so that when the said foot lever is thrown backward, the spring 28 may expand and the clutch will be projected so as to throw the machine in gear and when the foot lever is thrown forward the clutch will be retracted and the machine thrown out of gear. To prevent an accumulation of dirt upon the spur pinion 24 which would clog the action of the same and produce excessive wear, we provide a bracket or housing 31 which is secured to the adjacent bearing arm 21 and projects within the internal gear 25 and fits around the said spur pinion so that any dirt or other matter tending to lodge upon the pinion will be deflected and will fall to the ground.

The bevel gear 23 upon the right hand end of the driving shaft 22 meshes with a bevel pinion 32 on the rear end of a transmission shaft 33 which extends through the sleeve 5 and beyond the front end of the same and is there equipped with a crank disk 34 as shown. Upon the wrist pin 35 carried by the said crank disk we pivotally mount one end of a link 36 which is hollow and provided with an oil cup 37 on its upper side so that lubricant admitted to the interior of the said link will reach the wrist pin 35 and also pass to a similar pin 37' upon which the opposite end of the link is mounted. This wrist pin 37' is carried by an oscillatory arm 38 which is provided at its lower end with a crank pin 39 and a cross head 40 journaled upon the said pin and adapted to fit within a socket 41 provided in the cutter bar head or coupling 42. The upper end of the oscillatory arm 38 is constructed with a circular enlargement 43 adapted to fit around and pivot on an eccentric 44 at the upper end of a latch 45, the said latch being of such shape that it will conform to the outline of the arm 38 and fit within a recess provided in the upper portion of the rear side of the arm as shown clearly in Fig. 3. The lower end of this latch 45 carries a spring controlled locking pin 46 which is adapted to engage a socket in the oscillatory arm 38 so that the eccentric 44 will be held in the proper position for maintaining the cross head 40 in operative engagement with the head of the cutter bar. When it is desired to change the cutter it is necessary merely to withdraw the locking pin 46 and then swing the latch 45 upward, this action causing the eccentric 44 to raise the arm 38 and withdraw the cross head 40 from the socket 41, so that the cutter may then be withdrawn from the finger bar and a sharpened cutter substituted therefor without any appreciable loss of time. The eccentric 44 is provided with a longitudinal opening 47 constituting a bearing which is adapted to receive a pivot pin 48 which is carried by the upper end of a standard or carrying plate 49 which is secured rigidly to the front end of a hollow shaft 50 rotatably mounted in the sleeve 5 and fitting around the transmission shaft 33. On the hollow shaft 50 is a clamp having a crank 51 projecting through an opening 52 in the sleeve 5 and to the outer end of this crank we pivotally connect the outer end of a link or pitman 53 which extends inwardly toward the tongue or pole 13 and has is inner end pivotally connected to the rear end of a T-shaped or three-armed lever 54, the said lever 54 being loosely mounted at the end of its stem upon a depending stud or pivot pin 55 carried by the front end of the pole casting 8, the fitting being such that the lever 54 will be prevented from dropping but may oscillate freely in a horizontal plane and also rock vertically so as to accommodate the relative movement between the frame and the pole as the cutter bar is raised or lowered. The forward end of the lever 54 is constructed with a slot or elongated opening in which is engaged a connecting rod 56 which extends rearwardly at the side of the pole casting and is attached to a hand lever 57 extending upwardly adjacent the seat 14. The hand lever 57 is pivotally mounted upon the pole casting 8, as shown at 58, in rear of the pivotal connection 59 between said casting and the frame 3, and the lower end of the lever 57 is formed into a cam 60 which is adapted to engage a roller 61 at the rear end of the adjacent arm 7 so that as the cutter is swung toward a vertical position the frame will be tilted to raise the inner shoe and the lifting of the cutter will not be arrested by contact of the inner extremity of the same with the ground. The lever 57 is equipped with the usual latch 62 engaging a segment 63 on the pole casting. A tension spring 64 has one end secured to an eye-bolt 65 which is fitted in a lug or ear 66 on the frame 3 and has its opposite end connected with an intermediate portion of the head of the three-armed lever 54, as shown at 67. The eye bolt 65 is equipped with a nut 68 which is turned home against the outer side of the lug or ear 66 so as to place the spring 64 under any desired tension and this tension should be so regulated that when a lifting force is applied to the hand lever 57, the inner shoe, the cutter, and the parts connected therewith, will rise readily without strain upon the driver. The rock shaft or foot lever 10 is intended to aid the operation of the hand lever 57 and to that end a crank 69 is formed on the forward outer end of the said shaft and projects upwardly and outwardly over the connecting rod 56 to bear against the block or abutment 70 secured on said rod. The opposite end of the rock shaft extends rearwardly under the pole casting 8 and provides a somewhat elongated lever arm 71 equipped at its rear end with a foot rest or pedal 72.

At its lower end, the standard or supporting plate 49 is constructed with a sleeve 73 which fits between perforated lugs 74 on the upper side of the finger bar 75 at the inner end of the same. A pin 76, inserted through the said sleeve and the said lugs, serves to pivotally connect the finger bar to the standard or supporting plate so that the finger bar may have a rocking movement about its connection with the standard or supporting plate and thereby permit the front ends of the guard fingers to be set so that they will ride over places where it is desired to avoid weeds or other material which is not desirable in the hay or permit them to run in a depressed position so that they will readily pass under and lift matted grass. The guard fingers 76' may be of any desired form and secured to the finger bar in the usual or any preferred manner. The inner lug 74 is constructed with a lever arm 77 which extends upwardly and is constructed with an eye 78 at its upper end to receive a pivot pin 79 carried by the front end of a link 80 which extends rearwardly under the frame 3 and has its rear end pivoted to a hand lever 81, the said hand lever 81 being fulcrumed upon the adjacent bearing arm 21 and equipped with a latch 82 adapted to engage a segment 83 upon the said bearing arm so that the lever may be held in any set position. It will be readily understood that if the hand lever 81 be swung forwardly or backwardly the movement thereof will be transmitted through the link 80 to the lever arm 77 and the finger bar 75 consequently rocked about the pin 76 so that the cutter will be set at the desired angle to a horizontal plane. It will also be readily understood that when the hand lever 57 is swung rearwardly the hollow shaft 50 will be rocked and the standard or supporting plate 49 will consequently swing about the axis of said hollow shaft as a center and the entire cutting mechanism will be rocked in a vertical plane transversely of the machine and be thereby permitted to clear rocks or other large obstructions in the path of the cutter. If the machine is to be moved over a road or to be carried from one field to another field, the cutter may be thus raised to and held in a vertical position and the machine may then be driven through gates or other narrow spaces.

The cutter bar 84 has the knives 85 secured thereto and is mounted to reciprocate in grooves provided therefor upon the guard fingers and the finger bar in the usual manner. The head 42 is secured upon the cutter bar at the inner end of the same and the socket 41 is provided with flat inner walls so as to effectually engage the cross head 40 and receive motion therefrom, oil cavities 86 being formed in the walls of the socket and communicating therewith through openings 87 so that the cross head will be thoroughly lubricated and easy operation of the mechanism assured. As the machine is drawn forward with the internal gear 25 locked to the axle, motion will be transmitted through the driving shaft and the transmission shaft to the crank disk 34 so that the link 36 will be reciprocated across the face of the standard 49 and the arm 38 thereby oscillated about the pin 48. As the arm 38 oscillates the cross head 40 will be caused to exert force against the walls of the head 42 and the cutter bar will be thereby reciprocated. It will be noted that the swinging of the cutter to a vertical position is coaxial with the rotation of the transmission shaft and consequently when it is desired to lift the cutter bar it is not necessary to stop the operation of the cutter, and obstructions may be passed without any damage to the cutter and without losing the time required to shift the gear in and out.

The inner shoe 88 is secured to the inner end of the finger bar, and upon the upper side of the finger bar and the shoe we secure keepers or guides 89 which engage over the rear edges of the knives 85 and the front edge of the cutter head or coupling 42 and thereby serve to guide the same at its inner end. It will be readily understood that the shoe is intended to run upon the ground and support the cutter in the proper position to act upon the grass. It is sometimes desirable to cut the grass closer than it is cut at other times and to permit the cutter to be adjusted vertically so as to meet this requirement, we provide a supplemental shoe or runner 90 which is secured at its front end to the upturned front end of the shoe and has its rear end turned upwardly, as shown at 91, and provided with a slot 92 through which a securing bolt 93 is inserted into the rear end of the shoe. The supplemental shoe or runner can thus be adjusted so as to project below the shoe 88 or fit between ribs 94 on the under side thereof so that the cutter may be supported at the desired height.

The outer shoe 95 is a substantially triangular plate or block having an opening 96 to accommodate the end of the cutter and the said opening also receives the outer end of the finger bar 75 to which the shoe is rigidly secured. A supplemental shoe 97 is provided to permit the outer end of the cutter to be vertically adjusted and this supplemental shoe has its front end formed into a hook 98 adapted to engage in a socket formed in the shoe 95 while near its rear end a bracket 99 is secured to and rises from the shoe 97, said bracket being provided with a plurality of openings 100 through any one of which a securing bolt 101 carried by the shoe 95 may be inserted. The bolt 101 is fitted within a cavity or recess 102 formed in the web of the shoe 95 and is thereby held against rotation and supported at the desired height. A nut 103 mounted upon the outer end of the bolt is turned home against the bracket 99 so that the bracket may be secured in its set position and the shoe 97 properly adjusted.

A dividing board 104 has its front end pivotally attached to the rear end of the shoe 95 and fits against a stop shoulder 105 formed upon the shoe. The pivot bolt 106 is held against turning within the shoe and a spring 107 is fitted around the outer portion of this bolt to frictionally hold the dividing board in the position in which it may be set, the tension of the said spring being determined by a washer 108 and a nut 109 mounted upon the outer end of the bolt, as shown and as will be readily understood. The usual bar or rod 110 is carried by and projects upwardly and rearwardly from the dividing board 104.

111 designates a guard or housing plate secured to the frame 3 and extending over the bevel pinion 32.

It is thought the operation and advantages of our improved mower will be readily understood and appreciated from the foregoing description, taken in connection with the accompanying drawings.

Having thus described the invention, what is claimed as new is:

1. In a mower, the combination of a cutter-carrying frame, a pole connected with and projecting forwardly from the frame, a coupling pivoted at one end to the pole and having its opposite end free to project laterally from the grassward side of the pole, said free end of the coupling carrying draft-applying devices, and a draft rod engaged with said coupling between the free end of the same and the pivot thereof and extending rearwardly and laterally therefrom and connected to the frame.

2. In a mower, the combination of a cutter-carrying frame, a pole connected with and projecting forwardly from the frame, the pole and frame having relative rocking movement, a coupling mounted at one end upon the pole and projecting laterally from the grassward side of the pole, the coupling being provided at its free end with means for carrying a draft-applying device, and a draft rod engaged at its front end with said coupling between the free end thereof and the pole and extending rearwardly and laterally therefrom and connected at its rear end with the frame.

3. In a mower, the combination of a cutter-carrying frame, a pole pivotally connected with and projecting forwardly from the frame, a coupling comprising a shank passing under the pole and having one end turned up and pivoted on the stubble side of the pole, the free end of said shank being spaced from the grassward side of the pole and the shank having a recess near said end, a draft-applying device carried by the free end of the shank, and a draft rod engaged at its front end in said recess and having its rear end connected to the frame.

4. In a mower, the combination of a cutter carrying frame mounted for rocking movement about an axle, a pole pivotally mounted upon the rear side of the frame and extending forwardly therefrom, means for applying draft to the pole at the grassward side of the same, a draft rod engaged at its front end with said means and extending laterally and rearwardly therefrom, the rear end of said rod being connected to the frame, a compensating rod slidably mounted on the under side of the pole and having its rear end pivoted to the frame, and yieldable means acting on the front end of said rod and tending to draw the same forward.

5. In a mower, the combination of a frame mounted for rocking movement about a supporting axle and extending downwardly and forwardly therefrom, cutting mechanism carried by the lower front end of the frame, a pole pivotally mounted on the frame and extending forwardly therefrom, means on the pole for rocking the frame, a guide on the under side of the pole, a compensating rod slidable in said guide and having its rear end pivoted to the frame, a stop on the rod in advance of said guide, and a spring coiled around the rod between said guide and said stop.

6. In a mower, the combination of a cutter, an oscillatory arm pivotally supported above the cutter and operatively engaged therewith, a crank disk disposed above the cutter and at one side of the oscillatory arm, a hollow link having its ends pivotally attached to the crank disk and to the oscillatory arm respectively, means for permitting the filling of said link with lubricant, and means for rotating the crank disk.

7. In a mower, the combination of a cutter, an oscillatory arm pivotally supported above the cutter and operatively connected therewith, a crank disposed above the cutter and at one side of the oscillatory arm, a hollow link pivotally connecting the crank and the oscillatory arm, means for rotating the crank, and an oil receiver in the upper side of the hollow link and communicating with the interior of the same.

8. In a mower, the combination of a support, an eccentric on the support, a cutter carried by the support, an oscillatory arm having its upper end journaled upon the eccentric whereby it may be raised or lowered and its lower end movable freely into and out of engagement with the cutter, means for locking the eccentric and the oscillatory arm in a set relation, and means for actuating the oscillatory arm.

9. In a mower, the combination of a support, a cutter carried by the support and having a head provided with an open-topped socket, an eccentric mounted on the support, an oscillatory arm having its upper end journaled upon the said eccentric, a cross head carried by the lower end of the said oscillatory arm and fitting in the socket in the head of the cutter, and means for oscillating the said arm.

10. In a mower, the combination of a frame, a longitudinally extending rock shaft mounted in the frame at one side thereof, a cutter carried by the front end of said rock shaft, means for operating the cutter, a three-arm lever fulcrumed through its transverse arm upon the frame and spaced laterally from the shaft, a connection between the rear longitudinal arm of said lever and the rock shaft, means acting upon the forward longitudinal arm of the lever for oscillating the same, and a spring extending transversely relative to the rock shaft and having one end secured to the frame and its other end connected with said lever in rear of the fulcrum thereof.

11. In a mower, the combination of a rocking frame, a cutter carried by the frame, a lever having forwardly and rearwardly extending arms and fulcrumed on the frame with said arms between the fulcrum and the cutter, a spring disposed transversely of the frame and connected with the frame and with said lever, connections whereby oscillation of the lever will be transmitted to the cutter to raise or lower the cutter in a vertical plane at a right angle to the vertical plane in which the frame rocks, a hand lever mounted in rear of the first-named lever, an operative connection between said levers, and a rock shaft mounted transversely on the frame and operatively engaging said connection.

12. In a mower, the combination of a frame, a cutter carried thereby, means for operating the cutter, a lever mounted on the frame at one side of the cutter, a compensating spring connected with the frame and with said lever, connections between the lever and the cutter whereby oscillation of the lever will effect rocking of the cutter, a hand lever, a connecting rod connecting said hand lever with the first-mentioned lever, a projection on upper side of said connecting rod, and a rock shaft mounted on the frame and having a crank at one end bearing against the front side of said block.

13. In a mower, the combination of a frame mounted for rocking movement, a cutter carried by said frame, and means for raising or lowering the cutter in a vertical plane transversely of the frame and simultaneously rocking the frame.

14. In a mower, the combination of a supporting frame, carrying means for said frame, a pole pivotally connected to said frame, a cutter carried by said frame, means for operating the cutter, a hand lever carried by the pole and having a cam bearing upon the said supporting frame whereby to rock said frame, and connections between said lever and the cutter to swing the cutter in a vertical plane transverse to the supporting frame.

15. In a mower, the combination of a supporting frame, a hollow rock shaft mounted longitudinally in the frame, a standard fixed to the front end of said shaft, a cutter pivotally attached to the lower end of said standard, means acting upon the cutter to rock the same about its pivotal connection with the standard, a transmission shaft passing through the hollow shaft and operatively connected with the cutter, means for actuating said shaft, means connected to the rock shaft in rear of the standard for rocking the same, and a tension device acting on said means.

16. In a mower, the combination of a supporting standard, a cutter supported from said standard, a pivot projecting from the upper end of said standard, an eccentric hung on said pivot, an oscillatory arm having its upper end journaled on the said eccentric, a latch extending from said eccentric and adapted to fit against the oscillatory arm, a locking pin carried by the said latch and adapted to engage the said arm, means at the lower end of the oscillatory arm to engage the cutter, and means acting on the lower end of the said arm for actuating the same.

17. In a mower, the combination of a frame, a cutter carried by the frame, an open socket on the cutter, a crank carried by the frame, means on the frame for rotating the crank, an arm having its upper end pivotally supported on the frame and its lower end operatively engaging said socket, and a connection between the crank and said arm.

18. The combination of an axle, a frame mounted for rocking movement about the axle and having a relatively fixed longitudinally extending member at one side, cutting mechanism swiveled on the front end of said member to swing vertically in a plane at a right angle to the vertical plane of said member, a pole pivotally connected with the frame, the pivotal connection being eccentric to the axle and means on the pole to move the cutting mechanism about its swiveled connection with the longitudinal member of the frame.

19. In a mower, the combination of a frame, a hollow rock shaft housed within and extending longitudinally of the frame, a cutter carried by the front end of said rock shaft, means extending transversely of the frame and connected with the rock shaft in rear of its front end to rock the same and thereby raise or lower the cutter in a plane at a right angle to the plane of the rock shaft, a power transmitting shaft disposed within the rock shaft, means for rotating said shaft, and operative connections between said shaft and the cutter whereby the cutter may continue in motion when raised.

20. In a mower, the combination of a frame mounted for rocking movement and having rearwardly projecting arms between its ends and a forwardly projecting sleeve at one end, a rock shaft mounted in the sleeve, a cutter carried by the front end of said rock shaft, a pole casting pivoted to said rearwardly projecting arms, a hand lever pivoted on the pole casting and provided at its lower end with a cam bearing upon the adjacent rearwardly projecting arm, and connections between said hand lever and the rock shaft.

In testimony whereof we affix our signatures.

HENRY SYNCK. [L. S.]
BRUCE B. ROLLMAN. [L. S.]